United States Patent [19]

Schorr et al.

[11] 4,263,102

[45] Apr. 21, 1981

[54] PROCESS FOR THE CONTINUOUS RECOVERY OF THERMALLY UNSTABLE SOLVENT MIXTURES

[75] Inventors: Victor Schorr, Bad Soden; Gerhard Wirtz, Frankfurt am Main, both of Fed. Rep. of Germany

[73] Assignee: Edleanu GmbH, Frankfurt am Main, Fed. Rep. of Germany

[21] Appl. No.: 720,488

[22] Filed: Sep. 3, 1976

[30] Foreign Application Priority Data

Sep. 6, 1975 [DE] Fed. Rep. of Germany ....... 2539737

[51] Int. Cl.³ .......................... B01D 1/26; C07C 19/02
[52] U.S. Cl. ......................................... 203/22; 203/73; 203/74; 203/DIG. 19; 208/33; 202/173; 202/174; 202/180; 159/17 R; 570/262
[58] Field of Search ..................... 203/24, 73, 74, 22, 203/DIG. 19, 99; 208/33, 36; 260/652 P; 202/158, 173, 174, 180; 159/17 R

[56] References Cited

U.S. PATENT DOCUMENTS

| | | | |
|---|---|---|---|
| 2,672,434 | 3/1954 | MacFarlane | 203/74 |
| 3,130,143 | 4/1964 | Salmon et al. | 208/33 |
| 3,388,046 | 6/1968 | Hendrix | 203/22 |
| 3,412,016 | 11/1968 | Graven | 202/158 |
| 3,448,016 | 6/1969 | Hoppe | 260/652 P |
| 3,458,431 | 7/1969 | Nixon | 208/33 |

FOREIGN PATENT DOCUMENTS

| | | |
|---|---|---|
| 871742 | 3/1953 | Fed. Rep. of Germany . |
| 918651 | 9/1954 | Fed. Rep. of Germany . |
| 479106 | 4/1936 | United Kingdom ...................... 203/24 |

OTHER PUBLICATIONS

Schneider et al.: *Hydrocarbon Processing & Petroleum Refiner* (vol. 42), #12, pp. 104–106.

*Primary Examiner*—Wilbur L. Bascomb, Jr.
*Attorney, Agent, or Firm*—Carl G. Ries; Robert A. Kulason; Robert Knox, Jr.

[57] ABSTRACT

In recovering the multi-solvent portion of the oil solvent mixture in a solvent dewaxing process, decomposition of a thermally unstable, lower boiling solvent component is substantially avoided by recovering the solvent in a series of controlled evaporations whereby the major portion of the lower boiling solvent component is removed from the mixture prior to the removal of the remaining portion of the solvent. The solvent removal may be conducted in a high pressure evaporator having an upper section and a lower section separated by an annular tray.

8 Claims, 1 Drawing Figure

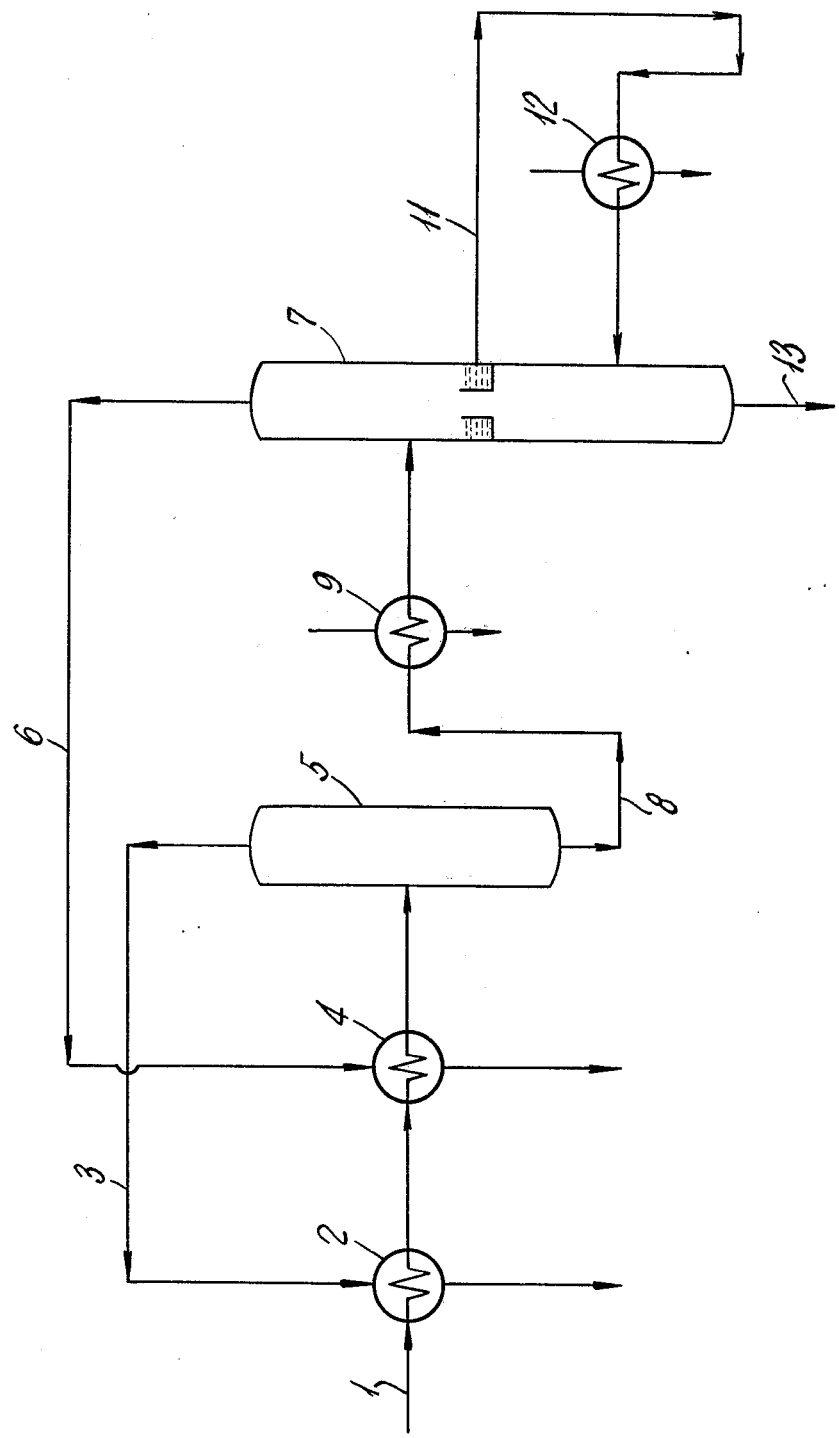

PROCESS FOR THE CONTINUOUS RECOVERY OF THERMALLY UNSTABLE SOLVENT MIXTURES

BACKGROUND OF THE INVENTION

The invention relates to a process in which thermally unstable solvent mixtures, whose components boil in closely related boiling ranges, are continuously recovered from higher boiling hydrocarbon mixtures by evaporating the solvents in several evaporators connected in series under increasing pressure and temperature. The evaporated solvent components are withdrawn as vapor from the upper part of the respective evaporator, while the bottoms product accumulates at the base of the evaporator.

Oil-solvent mixtures are often processed to separate the oil from the solvent. Such mixtures occur, for example, in the solvent dewaxing of mineral oil. One such process, known as the Di-Me solvent dewaxing process, utilizes a solvent mixture of dichloromethane and 1, 2 dichloroethane (for simplicity and in accordance with common usage, from which the process obtains its name, these components will be referred to hereinafter as "methylene chloride" and "dichloroethane", respectively). One embodiment of the Di-Me process is discussed in 42 "Hydrocarbon Processing & Petroleum Refiner", No. 12, 104–106 (1963). This process may be used to dewax low and high viscosity lubricating oils or to deoil paraffin waxes, slack waxes and similar oily wax mixtures. The raw distillate is diluted with the solvent mixture and then chilled. The function of each component in the solvent mixture is different. Dichloroethane is a wax precipitate while methylene chloride is a solvent for the oil. The wax, oil and solvent mixture is passed to rotary filters where it is separated into wax (containing solvent) and a filtrate mixture of wax-free oil and solvent. The wax cake is washed with cold solvent. The filter wash obtained forms part of the solvent added to the raw distillate. The filtrate and wax cake are processed in separate but similar solvent recovery systems where a series of evaporators separates the solvent from the wax and from the oil. Final traces of the solvent are removed by steam stripping.

In the recovery of oil-solvent mixtures, which occur, for example, in the solvent dewaxing of mineral oils and contain lower boiling chlorinated hydrocarbons, such as methylene chloride and dichloroethane, the solvent components are evaporated off in series connected evaporators with several pressure stages. Thus, from DT-PS (German Federal Republic patent) No. 871,742 it is known to connect in series with a first evaporator, a second evaporator operating at a higher pressure, and utilizes its vapor as a heating means for the inflow to the first evaporator. The bottoms product from the first evaporator is heated with a separate heating agent, such as, for example, steam, before it is introduced into the second evaporator. The evaporation temperature in the second evaporator is adjusted via the pressure, and is governed by the evaporation temperature of the solvent components and the desired amount of solvent which is to be removed in the first evaporator. For example, the second evaporator is operated at a temperature of about 130° C. and at a pressure of about 4 atmospheres. The inlet temperature of about 132° C. required in the second evaporator in order to fully evaporate methylene chloride and dichloroethane is obtained by heating the solution in a heat exchanger connected directly to the second evaporator, and which is charged with steam at a temperature of 145° C. The tube wall temperatures in the heat exchanger obtained with this steam temperature accelerate the decomposition of the thermally unstable methylene chloride. This results in solvent losses and corrosion damage to the apparatus and piping, since highly reactive and corrosive hydrogen chloride is formed in the decomposition of methylene chloride.

The tendency of chlorinated hydrocarbons to decompose has been recognized for a fairly long time and is the subject of various modification proposals. According to a process disclosed in DT-PS No. 918,651, the danger of decomposition is said to be avoided if the first solvent recovery evaporator is operated at temperatures below 100° C., preferably at 80°–90° C. At these temperatures a substantial part of the solvent, mainly the lower boiling, thermally unstable component, and a part of the water contained in the mixture, is driven off. However, it has been found that even this method does not completely avoid the tendency of chlorinated hydrocarbons to decompose. The bottoms product from the first evaporator still contains quantities of methylene chloride and has a volume which requires a corresponding large heating unit in order to heat the bottoms product to the desired inlet temperature of about 132° C., to the second evaporator. The residence time required for this and the tube wall temperatures of about 145° C. which are reached lead to an increased tendency of the methylene chloride still present in the solution to decompose. The residence time and the temperature determine the degree of decomposition of a thermally unstable component.

The object of the invention is to evaporate thermally unstable solvent components from higher boiling hydrocarbon mixtures in an economical process not subject to interruptions and disturbances. In particular, the object is to reduce the temperature and residence time in the solvent recovery from solvent dewaxing products so that thermal decomposition of the solvents is substantially eliminated and corrosion damage is avoided.

SUMMARY OF THE INVENTION

The object of this invention is achieved by effecting an initial separation of an oil-solvent mixture in a first evaporator, heating the bottoms product from the first evaporator to a temperature at which the thermal decomposition of the lower boiling solvent fraction is minimal, separating a major portion of the lower boiling solvent component from said first bottoms product in a second evaporator operating at a higher pressure than the first evaporator, heating the bottoms product from the second evaporator to the evaporation temperature of the higher boiling solvent component, separating the high boiling component and the remaining portion of the lower boiling component from said second bottoms product in a third evaporator operating at substantially the same pressure as the second evaporator. In a preferred embodiment the second and third evaporators are combined into a single vessel having a chimney tray or annular tray separating the vessel into an upper portion which serves as the second evaporator and a lower portion which serves as the third evaporator.

BRIEF DESCRIPTION OF THE DRAWING

The accompanying drawing is a schematic flow diagram of an embodiment of the process units and flow systems suitable for carrying out the process of the present invention.

DESCRIPTION OF THE PREFERRED EMBODIMENTS

This invention relates to improvements in separating the solvent-oil mixtures obtained in the solvent dewaxing of mineral oil. More particularly, it relates to the separation of a multi-component solvent from the solvent-oil mixture where one or more of the solvent components are thermally unstable, especially the lower boiling ones. An example of a solvent mixture to which this invention is directed is the two component solvent composed of methylene chloride and dichloroethane used in the Di-Me solvent dewaxing process. The lower boiling methylene chloride is thermally unstable and often decomposes to form corrosive quantities of HCl at some of the temperatures heretofore employed in the solvent recovery portion of the process.

This invention is directed to improvements in a process for continuously recovering a thermally unstable and lowest boiling solvent component from a mixture comprising a multi-component solvent and higher boiling hydrocarbons, wherein the recovery and separation is effected by evaporating said mixture in a multiplicity of evaporators connected in series with solvent components recovered as vaporous products and bottoms products recovered as liquid products from the evaporators, which comprises:

(a) heating a mixture comprising a multi-component solvent and higher boiling hydrocarbons, (b) evaporating said mixture to produce a first vaporous product comprising a portion of any water present in said mixture and a portion of the lowest boiling solvent component and a first bottoms product comprising the unevaporated portion of said mixture.

(c) heating said first bottoms product to a temperature at which the thermal decomposition of the lowest boiling solvent component is minimal, (d) evaporating said first bottoms product at a pressure higher than step (b) to produce a second vaporous product comprising a major portion of the lowest boiling solvent component and a second bottoms product comprising the unevaporated portion of said first bottoms product, (e) heating said second bottoms product to a temperature sufficient to effect the evaporation of the solvent remaining in said second bottoms product at substantially the same pressure of step (d).

(f) evaporating said second bottoms product at substantially the same pressure of step (d) to produce a third vaporous product comprising substantially all the solvent remaining in said second bottoms product and a third bottoms product comprising said higher boiling hydrocarbons, and (g) recovering as products:
the first vaporous product,
the second vaporous product,
the third vaporous product, and
the third bottoms product.

In one embodiment of this invention, utilized in the Di-Me solvent dewaxing process, the solvent is a mixture of methylene chloride and dichloroethane. Methylene chloride is the lower boiling and thermally unstable component of this solvent combination.

Although steps (d) and (e) may be conducted in separate evaporators, in a preferred embodiment both these steps may be conducted in a single vessel. In this embodiment, step (c) is achieved by heating the enriched bottoms product from the first evaporator to a temperature at which the thermal decomposition of the low boiling solvent fraction is scarcely noticeable. This enriched bottoms product, heated in the heat exchanger, is introduced into a specially designed evaporator with a chimney or annular tray which separates the interior of the evaporator into an upper and lower part, said introduction being effected above the annular tray. The low boiling component evaporates, whereby the solvent residue together with the higher boiling hydrocarbons collects as the liquid layer on the annular tray. This liquid is withdrawn, heated to the evaporation temperature of the higher boiling solvent component by an additional supply of heat, and recycled to the evaporator below the annular tray.

This annular tray has an open portion in the center to permit vapors from the lower section to pass to the upper section and is constructed with a weir around the top edge of this open portion to permit the unevaporated liquid in the upper section to collect on the tray prior to being removed from the evaporator. Those skilled in the art will appreciate that modifications to this annular tray as well as other well-known types of "trap trays" or "liquid drawoff trays" may be satisfactorily employed in place of the specific tray described herein.

The vapors of the solvent evaporated in the lower section, preferentially dichloroethane, where the solvent is a mixture of methylene chloride and dichloroethane, flow through the opening in the annular tray into the upper section of the evaporator. These vapors are withdrawn at the top of the evaporator column together with the solvent vapors produced in the upper section, preferentially, methylene chloride, while the hydrocarbon components freed from the solvent are withdrawn at the bottom of the column. Normally the last remaining solvent residues are stripped with steam in a subsequent column. The divided high pressure evaporator, making it possible to perform divided or split evaporation, permits a reduction of the temperature of the upstream heat exchanger and a reduction of the residence time in the downstream heat exchanger of the product withdrawn from the annular tray. The entire temperature profile in the two heat exchangers is brought to a lower temperature level by a decrease in the pressure drop. This decrease in the pressure drop is produced by splitting up the amount of heat necessary for the entire evaporation. If the amount of heat needed for the evaporation is imparted to the liquid mixture in a single heat exchanger, the partial evaporation occurring in the heat exchanger leads to a considerable rise in pressure governed by the longer path the mixture stream has to travel to absorb all the heat. The pressure drop from the pressure thus reached to the predetermined pressure for the evaporator column is substantially higher than in the case of a fractional addition of heat to two separate heat exchangers for the different mixture fractions.

The amount of heat required for the entire evaporation of the solvent is split up and is added to the mixture to be evaporated in a heat exchanger associated with the respective evaporator section. A substantial proportion of the required heat is added in the heat exchanger upstream from the upper evaporator section at lower tube wall temperatures than encountered heretofore, whereas in the heat exchanger for the lower evaporator section, the tube wall temperatures correspond to the temperatures used heretofore but the residence time is shortened.

As long as the oil-solvent mixture contains and thermally unstable component, low tube wall temperatures are maintained in the heat exchanger. After the evaporation of the thermally unstable component, the higher tube wall temperatures required for the higher boiling solvent fraction are obtained in a smaller size heat exchanger and with a shorter residence time. The heat exchanger can be constructed for high flow velocities corresponding to the smaller amount of liquid to be heated and the smaller temperature difference between the annular tray product and the higher boiling solvent component to be evaporated.

With a solvent of methylene chloride and dichlorothene, one set of operating conditions which we have found useful is:

step (a): the mixture is heated to between about 40 and about 80° C., step (b): the evaporation pressure is about atmospheric pressure, step (c): the first bottoms product is heated to about 110° C., steps (d) and (f): the evaporation pressure is about 4 atmospheres, and step (e): the second bottoms product is heated to about 132° C.

Our invention is explained in more detail by reference to an embodiment of the invention and the accompanying drawing.

A hydrocarbon-solvent mixture containing methylene chloride and dichloroethane is introduced through pipe 1 and passes through heat exchangers 2 and 4 into evaporator 5 operating at about atmospheric pressure. The vapors from evaporator 5 are introduced by means of pipe 3 to heat exchanger 2 in order to pre-heat the oil-solvent mixture. The bottoms product from the evaporator 5 passes through pipe 8 to heat exchanger 9, where it is heated to a temperature of about 110° C. with steam at a temperature of 120° C. The heated bottoms product is evaporated under a pressure of about 4 atmospheres in high pressure evaporator 7 in such a way that most of the low boiling methylene chloride contained in the solvent can be used as a heating agent in heat exchanger 4, by means of pipe 6. In this way, heat exchanger 4 attains an operating temperature in the range of 40°-80° C. High pressure evaporator 7 is divided by an annular tray 10 into an upper part in which the heated bottoms product is introduced, and a lower enrichment part. The unevaporated fraction of the methylene chloride collects together with dichloroethane and the hydrocarbon component on annular tray 10. This liquid flows from there, via pipe 11, to heat exchanger 12, which heats the liquid product to a temperature of about 132° C. with steam at a temperature of about 145° C. This temperature is sufficient to evaporate the solvent fraction consisting of dichloroethane in the lower enrichment part of high pressure evaporator 7. The dichloroethane vapors together with the methylene chloride vapors formed in the upper part of the evaporator are withdrawn at the top of the evaporator through pipe 6. The oil collecting at the bottom of high pressure evaporator 7 is withdrawn via pipe 13 and, optionally, is directed to a next stage in which the remaining solvent is removed by means of a vacuum stripper.

By subdividing high pressure evaporator 7, the evaporation heat for the oil-solvent mixture can be added in a planned manner so that in a first lower temperature region a tube wall temperature is maintained which is low enough to prevent any noticeable decomposition of the thermally unstable solvent component. After the thermally unstable component has been evaporated, the solvent mixture can be exposed to higher tube wall temperatures, the residence time now being shortened corresponding to the smaller amount of liquid to be heated. This reduction in the residence time is carried out by a smaller size heat exchanger 12.

Since the thermal decomposition of unstable substances depends on the temperature and period of time for which the temperature acts, the process according to this invention provides a considerable reduction in the thermal decomposition of the solvent components. A tube wall temperature is established in the high temperature region which is sufficient to evaporate the difficultly evaporable component of the solvent mixture. In this connection, comparably high temperatures can be chosen since there is virtually no danger of corrosion once the thermally unstable component has been removed.

We claim:

1. A process for continuously recovering a multi-component solvent, while substantially preventing the thermal decomposition of the thermally unstable and lowest boiling solvent component, methylene chloride (dichloromethane), of said multi-component solvent, from a mixture comprising a multi-component solvent and dewaxed mineral oil, said multi-component solvent consisting essentially of methylene chloride (dichloromethane) and dichloroethane (1,2-dichloroethane) and wherein the recovery and separation is effected by evaporating said mixture in a multiplicity of evaporators connected in series with solvent components recovered as vaporous products and bottoms products recovered as liquid products from the evaporators, the improvement which comprises:

(a) heating said mixture comprising methylene chloride, dichloroethane and dewaxed mineral oil, (b) evaporating said mixture to produce a first vaporous product comprising a portion of any water present in said mixture and a portion of the methylene chloride and a first bottoms product comprising the unevaporated portion of said mixture, (c) heating said first bottoms product to a temperature at which the thermal decomposition of the methylene chloride is minimal, (d) evaporating said first bottoms product at a pressure higher than step (b) to produce a second vaporous product comprising a major portion of the methylene chloride and a second bottoms product comprising the unevaporated portion of said first bottoms product, (e) heating said second bottoms product to a temperature sufficient to effect the evaporation of the solvent remaining in said second bottoms product at substantially the same pressure of step (d), (f) evaporating said second bottoms product at substantially the same pressure of step (d) to produce a third vaporous product comprising substantially all the solvent remaining in said second bottoms product and a third bottoms product comprising said dewaxed mineral oil, and (g) recovering as products:
the first vaporous product,
the mixture of the second and the third vaporous products, and the third bottoms product.

2. A process according to claim 1 wherein steps (d) and (f) are conducted in a single vessel comprising an upper portion and a lower portion, said portions being separated by an annular tray whereby step (d) is conducted in the upper portion, step (e) is conducted in the lower portion, the second bottoms product is recovered from the annular tray and the second and third vaporous products are recovered from the upper portion.

3. A process according to claim 1 wherein the first vaporous product provides a portion of the heat in the heating of step (a).

4. A process according to claim 1 wherein the second vaporous product provides a portion of the heat in the heating of step (a).

5. A process according to claim 1 wherein the third vaporous product provides a portion of the heat in the heating of step (a).

6. A process according to claim 1 wherein the mixture of step (a) is heated to between about 40° and about 80° C.

7. A process according to claim 1 wherein the evaporation pressure in step (b) is about atmospheric,
the first bottoms product is heated to about 110° C. in step (c),
the second bottoms product is heated to about 132° C. in step (e) and
the evaporation pressure in steps (d) and (f) is about 4 atmospheres.

8. A process according to claim 1 including the following additional step:
(h) vacuum stripping the third bottoms product to remove traces of solvent and produce a product comprising solvent-free dewaxed mineral oil.

* * * * *